US012578784B2

(12) United States Patent
Subramanyaiah

(10) Patent No.: US 12,578,784 B2
(45) Date of Patent: Mar. 17, 2026

(54) SYSTEM AND METHOD FOR USER ASSISTED EVENT-CONTEXT MANAGEMENT IN AN INTERNET OF THINGS ENVIRONMENT

(71) Applicant: Samsung Electronics Co., Ltd., Suwon-si (KR)

(72) Inventor: Rajendra Subramanyaiah, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/598,703

(22) Filed: Mar. 7, 2024

(65) Prior Publication Data

US 2024/0345652 A1 Oct. 17, 2024

(30) Foreign Application Priority Data

Apr. 11, 2023 (IN) .............................. 202341026917
Nov. 3, 2023 (IN) .............................. 202341026917

(51) Int. Cl.
*G06F 3/01* (2006.01)
*A01K 29/00* (2006.01)
*G16Y 20/10* (2020.01)
*G16Y 40/20* (2020.01)

(52) U.S. Cl.
CPC ............ *G06F 3/011* (2013.01); *A01K 29/005* (2013.01); *G16Y 20/10* (2020.01); *G16Y 40/20* (2020.01)

(58) Field of Classification Search
CPC ....... G06F 3/011; A01K 29/005; G16Y 20/10; G16Y 40/20
See application file for complete search history.

(56) References Cited

U.S. PATENT DOCUMENTS

| | | | |
|---|---|---|---|
| 10,079,691 B2 | 9/2018 | Christopher et al. | |
| 10,127,791 B2 | 11/2018 | Stevens et al. | |
| 2021/0217423 A1* | 7/2021 | Rakshit ................... | G10L 15/22 |
| 2024/0106905 A1* | 3/2024 | Josephson ............. | H04L 67/306 |
| 2024/0282204 A1* | 8/2024 | Kapoor ................... | G06F 3/015 |

* cited by examiner

*Primary Examiner* — Adam R. Giesy
(74) *Attorney, Agent, or Firm* — Nixon & Vanderhye, P.C.

(57) ABSTRACT

A method for user assisted event-context management in an internet of things (IoT) environment is disclosed. The method comprising: detecting, via one or more IoT devices and one or more smart devices, at least one of one or more current actions of a user or one or more events in the IoT environment; detecting, via the one or more IoT devices, a current operating state of each of the one or more devices within the IoT environment and obtaining, from a database, one or more specified association rules indicating a relationship between each of a plurality of predefined user actions, a plurality of specified events, and pre-configured operating states of the one or more devices; and controlling the current operating state of the one or more devices based on the obtained one or more specified association rules.

20 Claims, 11 Drawing Sheets

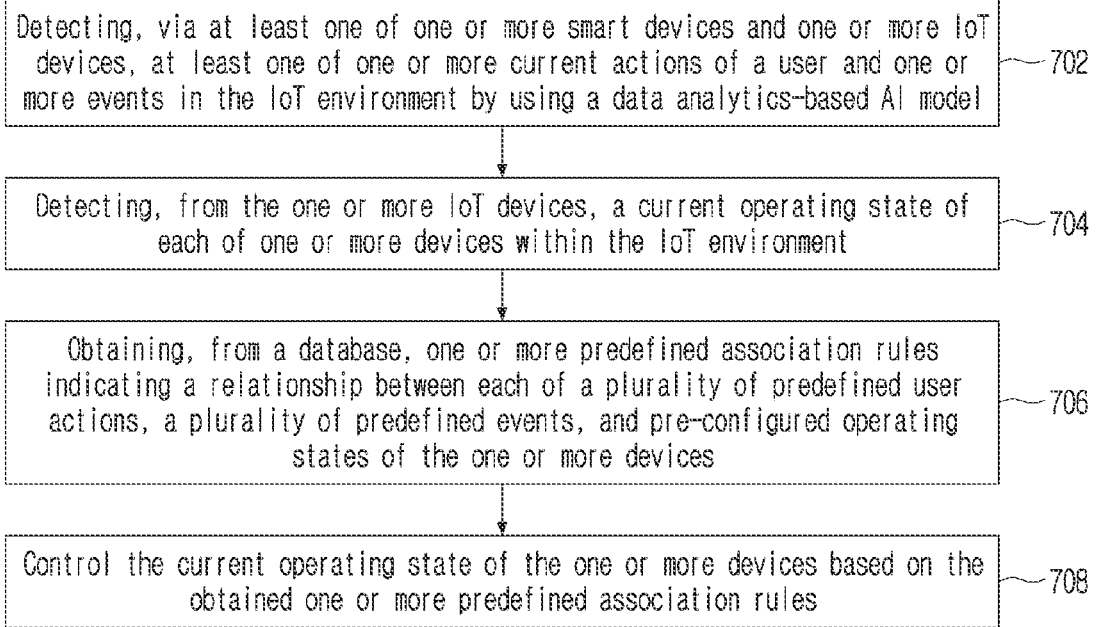

700

Detecting, via at least one of one or more smart devices and one or more IoT devices, at least one of one or more current actions of a user and one or more events in the IoT environment by using a data analytics-based AI model —702

Detecting, from the one or more IoT devices, a current operating state of each of one or more devices within the IoT environment —704

Obtaining, from a database, one or more predefined association rules indicating a relationship between each of a plurality of predefined user actions, a plurality of predefined events, and pre-configured operating states of the one or more devices —706

Control the current operating state of the one or more devices based on the obtained one or more predefined association rules —708

FIG. 8

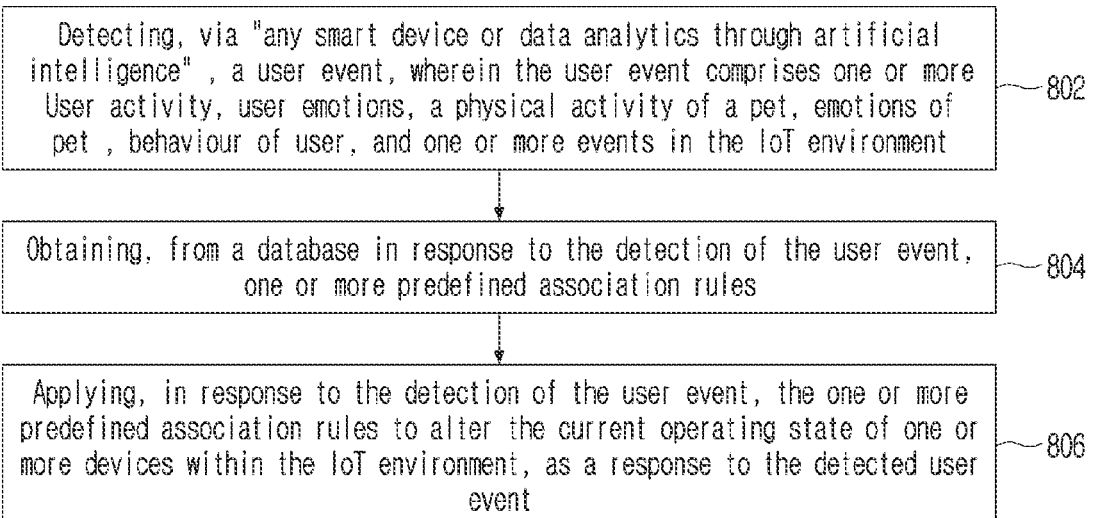

700

Detecting, via "any smart device or data analytics through artificial intelligence" , a user event, wherein the user event comprises one or more User activity, user emotions, a physical activity of a pet, emotions of pet , behaviour of user, and one or more events in the IoT environment —— 802

Obtaining, from a database in response to the detection of the user event, one or more predefined association rules —— 804

Applying, in response to the detection of the user event, the one or more predefined association rules to alter the current operating state of one or more devices within the IoT environment, as a response to the detected user event —— 806

SYSTEM AND METHOD FOR USER ASSISTED EVENT-CONTEXT MANAGEMENT IN AN INTERNET OF THINGS ENVIRONMENT

CROSS-REFERENCE TO RELATED APPLICATIONS

This application is based on and claims priority under 35 U.S.C. § 119 to Indian Provisional Patent Application No. 202341026917, filed on Apr. 11, 2023, and to Indian Complete patent application Ser. No. 202341026917, filed on Nov. 3, 2023, in the Indian Patent Office, the disclosures of each of which are incorporated by reference herein in their entireties.

BACKGROUND

1. Field

The disclosure relates to smart system and user communication, and for example, relates to a system and a method for user assisted event-context management in an internet of things (IoT) environment.

2. Description of Related Art

Internet of Things (IoT) devices are increasingly becoming an integral part of our daily lives and are deployed across multiple industries due to their ability to collect, transmit, and receive data over the internet. Further, users utilize IoT devices for various applications, such as smart home automation, healthcare, agriculture, retail, transportation, and the like. Generally, the users are required to manually operate the IoT devices or set rule-based triggers, where the rule-based triggers are considered only from smart devices or electronic devices to perform one or more actions. However, a user may get involved in various conditions, emotions, or activities that can distract the user from performing an ongoing activity or controlling the operating state of each of the IoT devices. In conventional solutions, these distracting factors are triggers for controlling the operating state of each of the IoT devices.

For instance, when the user is in a kitchen and receives a phone call, the user may leave the kitchen while talking on the phone and forget cooking conditions for some time. As a result, the food may conflagrate leading to a severe accident. In another example, the user may engage in activities, such as yoga or exercise, and at the same time, the user's pet requires food and starts barking. Currently, there is no automatic method to understand this condition of a pet and start the action of feeding the pet automatically. Thus, there is a coordination gap between the user and IoT device interaction or communications for the automatic execution of one or more actions. Conventional solutions related to the IoT devices execute the actions based on the status of the IoT devices (such as on and off), events from other IoT devices, or rule-based triggers. Thus, the conventional solutions fail to integrate emotions or activities associated with the user into the automatic execution of one or more actions to be performed by the IoT devices. Accordingly, there is a need for a technique to address the above-identified problems.

SUMMARY

According to an example embodiment of the present disclosure, a method for user assisted event-context management in an internet of things (IoT) environment is disclosed. The method includes detecting, via at least one of one or more IoT devices and one or more smart devices, at least one of one or more current actions of a user or one or more events in the IoT environment using a data analytics-based Artificial Intelligence (AI) model. The method includes detecting, via the one or more IoT devices, a current operating state of each of the one or more devices within the IoT environment. The method includes obtaining, from a database in response to the detection of the at least one of one or more current actions of the user, the one or more events in the IoT environment or the current operating state of the one or more devices, one or more specified association rules indicating a relationship between each of a plurality of specified actions, a plurality of specified events, and configured operating states of the one or more devices. The method includes controlling the current operating state of the one or more devices based on the obtained one or more specified association rules.

According to an example embodiment of the present disclosure, a method for user assisted event-context management in an IoT environment is disclosed. The method includes detecting, via a first IoT device and one or more smart devices, a user event using a data analytics-based Artificial Intelligence (AI) model, wherein the user event comprises one or more current actions of a user, user emotions, a physical activity of a pet, and one or more events in the IoT environment. The method includes obtaining, from a database in response to the detection of the user event, one or more specified association rules. The method includes applying, in response to the detection of the user event, the one or more specified association rules to alter the current operating state of one or more devices within the IoT environment, as a response to the detected user event.

According to an example embodiment of the present disclosure, a system for event-context management in an Internet of Things (IoT) environment is disclosed. The system includes: a memory and at least one processor, comprising processing circuitry, individually and/or collectively configured to detect, via one or more IoT devices and one or more smart devices, at least one of one or more current actions of a user or one or more events in the IoT environment using a data analytics-based Artificial Intelligence (AI) model.; detect, via the one or more IoT devices, a current operating state of each of the one or more devices within the IoT environment; obtain, from a database in response to the detection of the at least one of one or more current actions of the user, the one or more events in the IoT environment or the current operating state of the one or more devices, one or more specified association rules indicating a relationship between each of a plurality of predefined user actions, a plurality of specified events, and \configured operating states of the one or more devices; and control the current operating state of the one or more devices based on the obtained one or more specified association rules.

According to an example embodiment of the present disclosure, a system for event-context management in an Internet of Things (IoT) environment is disclosed. The system includes: a memory and at least one processor, comprising processing circuitry, individually and/or collectively configured to detect, via a first IoT device and one or more smart devices, a user event using a data analytics-based Artificial Intelligence (AI) model, wherein the user event comprises one or more current actions of a user, user emotions, a physical activity of a pet, and one or more events in the IoT environment; obtain, from a database in response to the detection of the user event, one or more specified association rules; apply, in response to the detection of the user event, the one or more specified association rules to alter the current operating state of one or more devices within the IoT environment, as a response to the detected user event. To further clarify the advantages and features of the present disclosure, a more detailed description will be rendered with reference to various example embodiments thereof, which are illustrated in the appended drawings. It will be appreciated that these drawings simply depict example embodiments of the disclosure and are therefore not to be considered as limiting of its scope. The disclosure will be described and explained with additional specificity and detail with reference to the accompanying drawings.

BRIEF DESCRIPTION OF THE DRAWINGS

The above and other features, aspects, and advantages of certain embodiments of the present disclosure will be more apparent from the following detailed description, taken in conjunction with the accompanying drawings in which like characters represent like parts throughout the drawings, and in which:

FIGS. 6A, 6B and 6C are diagrams illustrating an example use-case scenario for the user assisted event-context management in the IoT environment, according to various embodiments;

FIG. 7 is a flowchart illustrating an example method for user assisted event-context management in the IoT environment, according to various embodiments; and FIG. 8 is a flowchart illustrating an example method for user assisted event-context management in the IoT environment, according to various embodiments.

Figure 1:
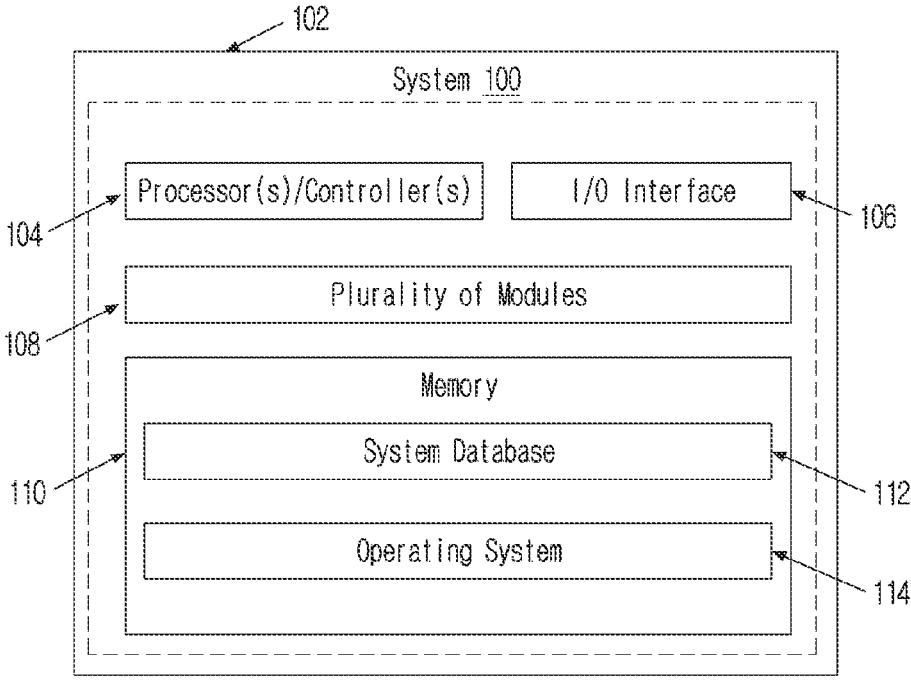
FIG. 1 is a block diagram illustrating an example configuration of a system for user assisted event-context management in an Internet of Things (IoT) environment, according to various embodiments.

Further, skilled artisans will appreciate those elements in the drawings are illustrated for simplicity and may not have necessarily been drawn to scale. For example, the flowcharts illustrate the method in terms of operations involved to help to improve understanding of aspects of the present disclosure. Furthermore, in terms of the construction of the device, one or more components of the device may have been represented in the drawings by conventional symbols, and the drawings may show those specific details that are pertinent to understanding the various embodiments of the present disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the various example embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this disclosure to "an aspect", "another aspect" or similar language may refer, for example, to a particular feature, structure, or characteristic described in connection with an embodiment being included in an embodiment of the present disclosure. Thus, appearances of the phrase "in an embodiment", "in another embodiment" and similar language throughout this disclosure do not necessarily all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

FIG. 1 is a block diagram illustrating an example configuration of a system 100 for user assisted event-context management in an Internet of Things (IoT) environment, according to various embodiments. In an embodiment of the present disclosure, event context management in the context of the IoT environment refers to the process of collecting, analyzing, and utilizing contextual information associated with a voice command and a user. In an embodiment of the present disclosure, the data associated with the contextual information is analyzed through artificial intelligence and machine learning models and utilize the factors derived from the artificial intelligence and machine learning models. These factors may be user context, user voice, user emotions, user behavior, pet emotions, pet activities or anything derived from machine learning insights. Further, the contextual information is used to perform one or more actions. In an embodiment of the present disclosure, the system 100 may be implemented in an electronic device 102. Examples of the electronic device 102 may include, but are not limited to, a smartphone, a laptop, a camera device, a smartwatch, and the like.

The system 100 may include one or more processors/controllers (e.g., including processing circuitry) 104, an Input/Output (I/O) interface (e.g., including input/output circuitry) 106, a plurality of modules (e.g., including various circuitry and/or executable program instructions) 108, and a memory 110.

In an example embodiment, one or more processors/controllers 104 may be operatively coupled to each of the respective I/O interface 106, the plurality of modules 108, and the memory 110. In an embodiment, one or more processors/controllers 104 may include at least one data processor for executing processes in a Virtual Storage Area Network. The one or more processors/controllers 104 may include specialized processing units such as integrated system (bus) controllers, memory management control units, floating point units, graphics processing units, digital signal processing units, etc. In an embodiment, the one or more processors/controllers 104 may include a Central Processing Unit (CPU), a Graphics Processing Unit (GPU), or both. The one or more processors/controllers 104 may be one or more general processors, digital signal processors, application-specific integrated circuits, field-programmable gate arrays, servers, networks, digital circuits, analog circuits, combinations thereof, or other now known or later developed devices for analyzing and processing data. The one or more processors/controllers 104 may execute a software program, such as code generated manually (e.g., programmed) to perform the desired operation. In an embodiment of the present disclosure, the processors/controllers 104 may be a general-purpose processor, such as the CPU, an Application Processor (AP), or the like, a graphics-only processing unit such as the GPU, a Visual Processing Unit (VPU), and/or an Artificial Intelligence (AI)-dedicated processor, such as a Neural Processing Unit (NPU). The processor/controller 104 according to an embodiment of the disclosure may include various processing and/or control circuitry and/or multiple processors. For example, as used herein, including the claims, the term "processor" and/or "controller" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

Further, the one or more processors/controllers 104 may control the processing of input data in accordance with a predefined operating rule or machine learning (ML) model stored in the non-volatile memory and the volatile memory. The predefined operating rule or the ML model may be provided through training or learning.

Here, being provided through learning may refer, for example, to, by applying a learning technique to a plurality of learning data, a predefined operating rule or the ML model of a desired characteristic being made. The learning may be performed in a device itself in which ML according to an embodiment is performed, and/or may be implemented through a separate server/system.

Furthermore, the ML model may include a plurality of neural network layers. Each layer may have a plurality of weight values and performs a layer operation through the calculation of a previous layer and an operation of a plurality of weights. Examples of neural networks include but are not limited to, Convolutional Neural Networks (CNN), Deep Neural Networks (DNN), Recurrent Neural Networks (RNN), Restricted Boltzmann Machine (RBM), Deep Belief Networks (DBN), Bidirectional Recurrent Deep Neural Network (BRDNN), Generative Adversarial Networks (GAN), and deep Q-network.

The learning technique may refer, for example, to a method for training a predetermined target device (for example, a robot) using a plurality of learning data to cause, allow, or control the target device to decide or predict. Examples of learning techniques include, but are not limited to, supervised learning, unsupervised learning, semi-supervised learning, or reinforcement learning.

The one or more processors/controllers 104 may be disposed in communication with one or more input/output (I/O) devices via the respective I/O interface 106. The I/O interface 106 may employ communication code-division multiple access (CDMA), high-speed packet access (HSPA+), global system for mobile communications (GSM), long-term evolution (LTE), WiMax, or the like, etc.

The one or more processors/controllers 104 may be disposed of in communication with a communication network via a network interface. In an embodiment, the network interface may be the I/O interface 106. The network interface may connect to the communication network to enable the connection of the electronic device 102 with the other electronic devices. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, and the like.

In an embodiment of the present disclosure, the one or more processors/controllers 104 are configured to detect, via one or more IoT devices and one or more smart devices, one or more current actions of the user, one or more events in the IoT environment, or a combination thereof using a data analytics-based Artificial Intelligence (AI) model. The one or more processors 104 are also configured to detect, via the one or more IoT devices, the current operating state of each of the one or more devices within the IoT environment. Further, the one or more processors 104 are configured to obtain, from a database in response to the detection of the at least one of one or more current actions of the user, the one or more events in the IoT environment or the current operating state of the one or more devices, one or more predefined association rules indicating a relationship between each of a plurality of predefined user actions, a plurality of predefined events, and pre-configured operating states of the one or more devices. The one or more processors 104 are configured to control the current operating state of the one or more devices based on the obtained one or more predefined association rules.

In various embodiments, the memory 110 may be communicatively coupled to the one or more processors/controllers 104. The memory 110 may be configured to store data, and instructions executable by the one or more processors/controllers 104. The memory 110 may include but is not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 110 may include a cache or random-access memory for the one or more processors/controllers 104. In various examples, the memory 110 may be a part of the one or more processors/controllers 104, such as a cache memory of a processor, the system memory, or other memory. In various embodiments, the memory may be an external storage device or database for storing data. The memory 110 may be operable to store instructions executable by the one or more processors/controllers 104. The functions, acts, or tasks illustrated in the figures or described may be performed by the programmed processor/controller for executing the instructions stored in the memory 110. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like. In various embodiments, the plurality of modules 108 may be included within the memory 110. The memory 110 may further include a system database 112 to store data. The plurality of modules 108 may include a set of instructions that may be executed to cause the system 100 to perform any one or more of the methods/processes disclosed herein. The plurality of modules 108 may be configured to perform the steps of the present disclosure using the data stored in the system database 112 for the event-context management in the IoT environment, as discussed herein. In an embodiment, each of the plurality of modules 108 may be a hardware unit that may be outside the memory 110. Further, the memory 110 may include an operating system 114 for performing one or more tasks of the system 100, as performed by a generic operating system 114 in the communications domain. In an embodiment, the system database 112 may be configured to store the information as required by the plurality of modules 108 and the one or more processors/controllers 104 for the event-context management in the IoT environment.

In an embodiment of the present disclosure, at least one of the plurality of modules 108 may be implemented through the ML model. A function associated with the ML may be performed through the non-volatile memory, the volatile memory, and the one or more processors 104. In an embodiment, the I/O interface 106 including various circuitry that may enable input and output to and from the system 100 using suitable devices such as, but not limited to, a display, a keyboard, a mouse, a touch screen, a microphone, a speaker, and so forth.

Figure 2:
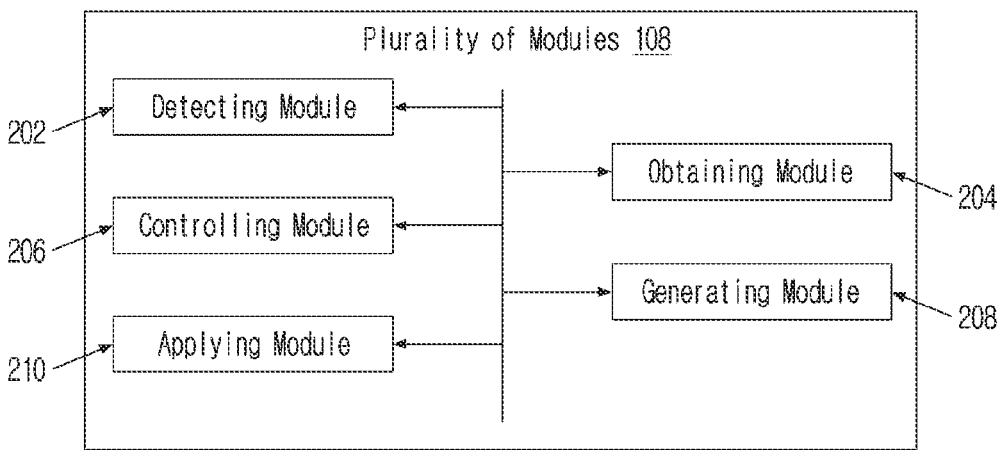
FIG. 2 is a block diagram illustrating an example configuration of a plurality of modules of the system at an electronic device for the user assisted event-context management in the IoT environment, according to various embodiments.

Further, the present disclosure also contemplates a computer-readable medium that includes instructions or receives and executes instructions responsive to a propagated signal. Further, the instructions may be transmitted or received over the network via a communication port or interface or using a bus (not shown). A communication port or interface may be a part of the one or more processors/controllers 104 or may be a separate component. The communication port may be created in software or may be a physical connection in hardware. The communication port may be configured to connect with a network, external media, the display, or any other components in the electronic device 102, or combinations thereof. The connection with the network may be a physical connection, such as a wired Ethernet connection, or may be established wirelessly. Likewise, the additional connections with other components of the electronic device 102 may be physical or may be established wirelessly. The network may alternatively be directly connected to the bus. For the sake of brevity, the architecture and standard operations of the operating system 114, the memory 110, the system database 112, the one or more processors/controllers 104, and the I/O interface 106 are not discussed in detail. FIG. 2 is a block diagram illustrating an example configuration of the plurality of modules 108 of the system 100 at the electronic device 102 for the user assisted event-context management in the IoT environment, according to various embodiments. In an embodiment of the present disclosure, the plurality of modules 108 may include but is not limited to, a detecting module 202, an obtaining module 204, a controlling module 206, a generating module 208, and an applying module 210. The plurality of modules 108 may be implemented by way of suitable hardware and/or software applications. For example, the various modules may include various circuitry and/or executable program instructions.

In an embodiment of the present disclosure, the detecting module 202 may be configured to detect, via the one or more IoT devices one or more smart devices, one or more current actions of a user, one or more events in the IoT environment, or a combination thereof using a data analytics-based Artificial Intelligence (AI) model. Examples of the one or more current actions may include but are not limited to, user emotions, user activities, user speech, user dialogue, user gestures, user behaviour, user interactions with at least one of the one or more devices, a pet, one or more family members, or guests, or any combination thereof. Further, the one or more events in the IoT environment include, but are not limited to, a movement of one or more objects within the IoT environment, weather conditions, interactions of a pet with the user, activities, emotions, and behaviour associated with the pet, or any combination thereof. For example, the electronic device 102 may include but is not limited to, a smartphone, a laptop, a camera device, a smartwatch, and the like. In an embodiment of the present disclosure, the one or more IoT devices and the one or more smart devices may include gadgets, sensors, appliances, and other devices that collect and exchange data over the internet.

Further, the detecting module 202 may be configured to detect, via the one or more IoT devices, the current operating state of each of one or more devices within the IoT environment. In an embodiment of the present disclosure, the one or more devices may be electronic devices, the one or more IoT devices, or a combination thereof. In an example embodiment of the present disclosure, the current operating state of the one or more devices may be ON, OFF, and the like.

Furthermore, the obtaining module 204 may be configured to obtain, from a database, one or more predefined association rules indicating a relationship between each of a plurality of predefined user actions, a plurality of predefined events, and pre-configured operating states of the one or more devices. In an embodiment of the present disclosure, the one or more predefined association rules are obtained from the database in response to the detection of the one or more current actions of the user, the one or more events in the IoT environment, the current operating state of the one or more devices. In an embodiment of the present disclosure, the plurality of predefined user actions includes user emotions, user activities, user speech, user dialogue, user gestures, user behaviour, user interactions with at least one of the one or more devices, a pet, one or more family members, or guests, or any combination thereof. Further, the plurality of predefined events includes a movement of one or more objects within the IoT environment, weather conditions, interactions of a pet with the user, activities, emotions, or behaviour associated with the pet, or any combination thereof. In an embodiment of the present disclosure, the plurality of predefined events may continuously be updated & increased based on new events and new association relationships found during continuous analysis from the machine learning model.

Further, the controlling module 206 may be configured to control the current operating state of the one or more devices based on the obtained one or more predefined association rules. In controlling the current operating state of the one or more devices, the controlling module 206 may be configured to determine one or more device actions to be performed by the one or more devices based on the obtained one or more predefined association rules. Further, the obtaining module 204 may be configured to control one or more operating modes of the one or more devices based on the determined one or more device actions.

In an embodiment of the present disclosure, the generating module 208 may be configured to monitor, using the one or more IoT devices within the IoT environment, the plurality of user actions and the plurality of events over a period of time. Further, the generating module 208 may be configured to determine, using, for example, one or more Artificial Intelligence (AI)-based models, a user activity pattern with respect to an operating state pattern of the one or more devices and a pattern associated with the plurality of events based on a result of the monitoring of the plurality of user actions and the plurality of predefined events over a period of time. Furthermore, the generating module 208 may be configured to generate, using the one or more AI-based models, a set of analytical factors based on the determined user activity pattern. In an embodiment of the present disclosure, the set of analytical factors may correspond, for example, to the plurality of predefined user actions, the plurality of predefined events, or a combination thereof. Details on the training of the one or more AI-based models, the user activity pattern, and the operating state pattern are described in greater detail below with reference to FIG. 3.

Further, the generating module 208 may be configured to select an analytical factor from the set of analytical factors based on a reception of at least one user input. The generating module 208 may also be configured to map the at least one selected analytical factor with one or more operating modes of the one or more devices. Furthermore, the generating module 208 may be configured to generate the one or more predefined association rules based on the mapping. In an embodiment of the present disclosure, each of one or more predefined association rules corresponds to a regular user-scenario for controlling the one or more operating modes of the one or more devices.

In an embodiment of the present disclosure, the one or more predefined association rules may include the list of maps or the association rules, wherein each map is a combination of two are more items including the set of analytical factors derived from artificial intelligence and machine learning model, and the device states/events. In other terms, each map of the list of maps corresponds to a successful user scenario which includes a combination of the set of analytical factors and device events to make a user scenario successful. In learning technique, if an association rule matches to a real time scenario, the system selects, executes and creates the association rules. Further, in learning technique, if an association rule matches to a real time scenario but one or more analytical factors or events are missing in the real time, the system automatically generates or recommends the user to generate a new association rule by combining the one or more analytical factors in a map and generates a new association rule. In an embodiment of the present disclosure, the controlling module 206 may be configured to detect, using the one more IoT devices and the one or more smart devices, at least one unusual event within the IoT environment that is undefined in the one or more predefined association rules using the data analytics-based AI model. The at least one unusual event corresponds to an event that indicates an unusual condition within the IoT environment or an event indicating an unusual pattern associated with use of the one or more devices in the IoT environment. Further, the controlling module 206 may be configured to determine, using information included in the database, a corresponding predefined association rule associated with the detected at least one unusual event. The controlling module 206 may be configured to generate, using one or more AI-based models, one or more additional analytical factors based on the determined corresponding predefined association rule. The controlling module 206 may be configured to control the current operating state of the one or more devices based on the generated one or more additional analytical factors and predefined operation information. In an embodiment of the present disclosure, the predefined operation information facilitates the system 100 to control the current operating state of the one or more devices without any requirement of user involvement. Details on the at least one unusual event, the unusual condition, and the unusual pattern will be described in greater detail below with reference to at least FIGS. 3A and 3B. In an embodiment of the present disclosure, the controlling module 206 may be configured to display the generated one or more additional analytical factors on a display screen of a user device associated with the user. In an example embodiment of the present disclosure, the user device may be the electronic device 102, such as a smartphone, a laptop, and the like. Further, the controlling module 206 may be configured to map the generated one or more additional analytical factors with one or more operating modes of the one or more devices based on a reception of at least one user input on the displayed one or more additional analytical factors. For example, the additional analytical factors may be dog barking and the one or more operating modes of the one or more devices may be "starting the pet feeder", such that when the dog starts barking, the pet feeder is automatically started in the real-time. Further, the controlling module 206 may be configured to generate the one or more predefined association rules based on the mapping. The controlling module 206 may further be configured to control the current operating state of the one or more devices based on the generated one or more predefined association rules.

In an embodiment of the present disclosure, the detecting module 202 may be configured to detect, via a first IoT device and the one or more smart devices, a user event using the data analytics-based AI model. In an embodiment of the present disclosure, the user event includes the one or more current actions of a user, user emotions, the physical activity of a pet, and the one or more events in the IoT environment. Further, the obtaining module 204 may be configured to obtain, from the database in response to the detection of the user event, the one or more predefined association rules. In an embodiment of the present disclosure, the one or more predefined association rules indicate a relationship between each of the plurality of predefined user actions, the plurality of predefined events, and pre-configured operating states of the one or more devices. Furthermore, the applying module 210 may be configured to apply, in response to the detection of the user event, the one or more predefined association rules to alter the current operating state of one or more devices within the IoT environment, as a response to the detected user event.

In operation, the system allows the user to smartly choose or receive suggestion related to one or more user emotion, user activity, pet activity or any analytical factor derived from artificial intelligence, such that the analytical factors can be associated with electronic device events to understand human situation and perform automatic execution of the one or more actions from the one or more IoT devices.

Details on the operation of the system 100 will be described in greater detail below at least with reference to FIGS. 4, 5, 6A, 6B and 6C.

Figure 3A:
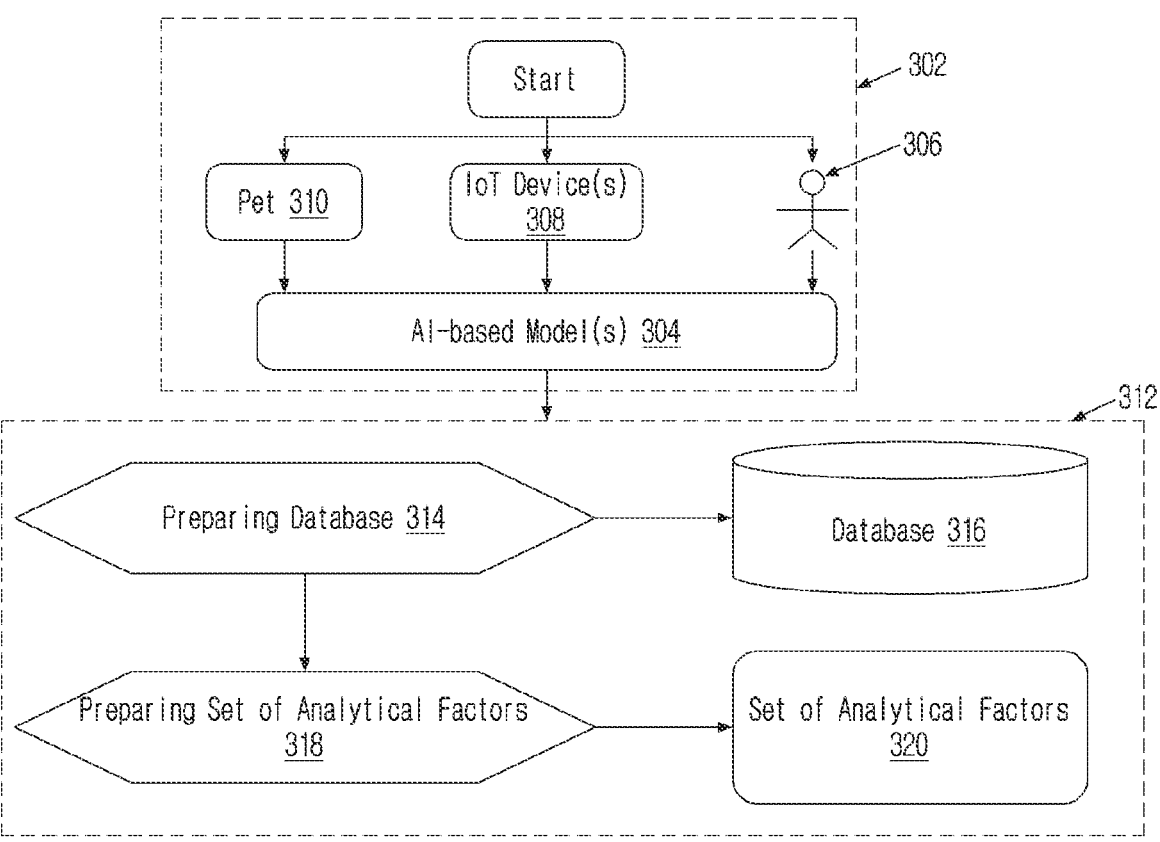
FIGS. 3A and 3B are diagrams illustrating examples of training of one or more Artificial Intelligence (AI)-based models, according to various embodiments.
Figure 3B:
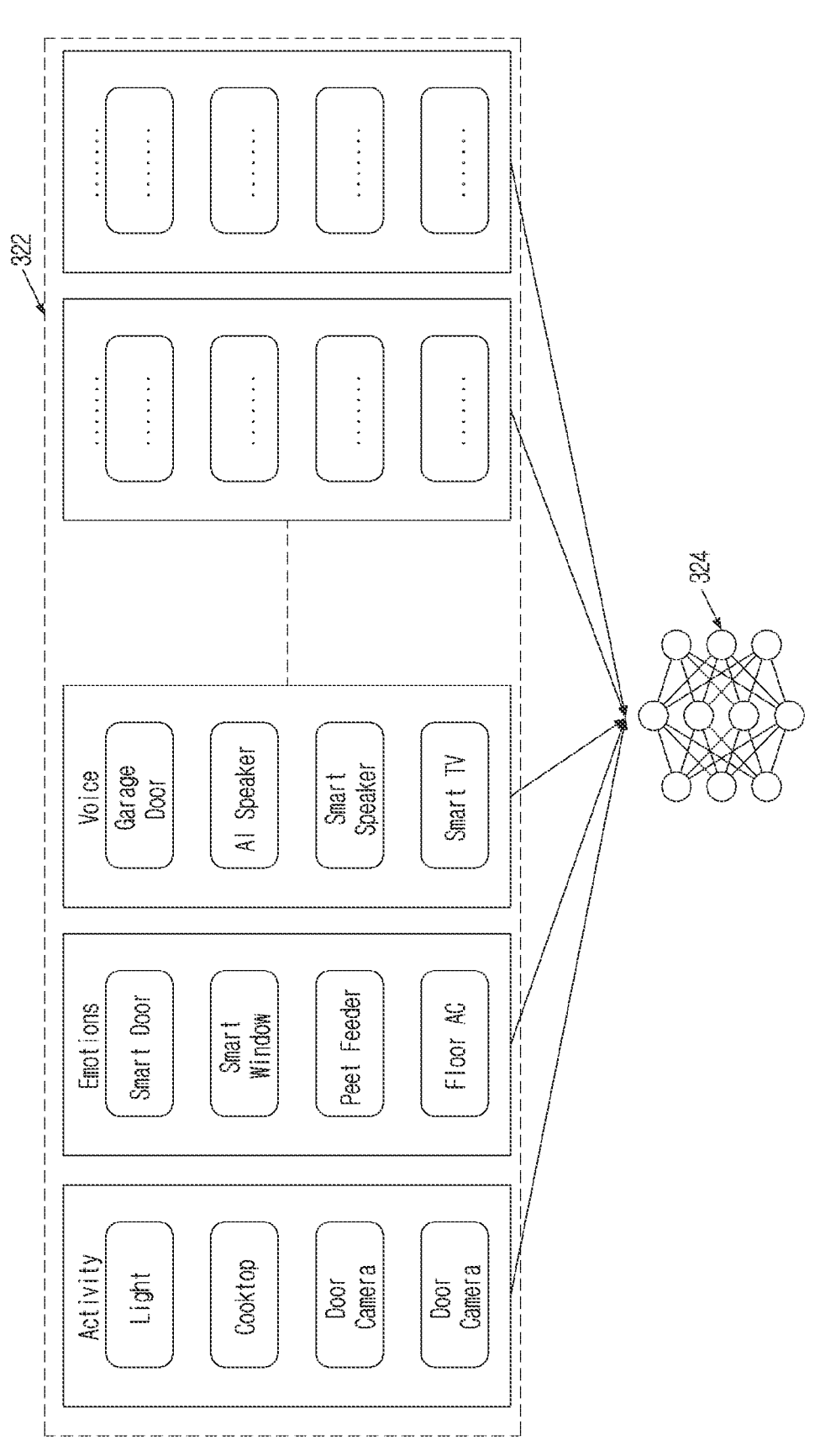

FIGS. 3A and 3B are diagrams illustrating examples of training of the one or more AI-based models, according to various embodiments. For the sake of brevity, FIGS. 3A and 3B are explained together. As explained with reference to FIG. 2, the one or more AI-based models facilitate the generation of the set of analytical factors. FIGS. 3A and 3B illustrate examples of the process of training the one or more AI-based models.

At step 302, the one or more AI-based models 304 collect training data including the user data associated with the user 306, IoT data associated with the one or more IoT devices 308, and pet data associated with the pet/pets 310 of the user. In an embodiment of the present disclosure, the user data may include regular activities of the user 306, interactions of the user 306 with the one or more IoT devices 308, the voice of the user 306, dialogues of the user 306, the behaviour of the user 306, emotions of the user 306, interactions of the user 306 with pets 310, interactions of the user 306 with other family members, interactions of the user 306 with guests, and the like. Further, the IoT data may include details of the one or more IoT devices 308 associated with the user 306, one or more activities performed by each of the one or more IoT devices 308, duration of each of the one or more activities, one or more IoT device operations, an operating state of each of the one or more IoT devices 308, outputs of the one or more IoT devices 308, capabilities of the one or more IoT devices 308, functionalities of the one or more IoT devices 308, and the like. In an example embodiment of the present disclosure, the pet data include regular activities of the pet 310, interactions of the pets 310 with the user 306, the behaviour of the pets 310 (such as barking), emotions of the pets 310, and the like. In an embodiment of the present disclosure, the training data is gathered for a minimum of 30 days. Further, the training data is observed and gathered using the one or more AI-based models (e.g., existing machine learning and artificial intelligence system), such as a computer vision system, context-aware system, reasoning-system, self-aware system, video analytics, Natural Language Processing (NLU), situation awareness system, posture detections, any kind of big data analytics, and the like.

In an embodiment of the present disclosure, the training data collected are analyzed by the system to determine IoT device types, device capabilities, operations, success/failure, natural/unnatural scenarios, and the like, as explained in detail in subsequent paragraphs of the disclosure. Further, from the analyzed data, the system determines the set of analytical/smart factors and combination of analytical/smart factors creating the user scenarios, as explained in detail in subsequent paragraphs of the disclosure. The created user scenarios are trained with the ML model as natural scenarios or natural sequence of factors to form the list of natural/success scenarios, as explained in greater detail below. Further, all the created user scenarios lists are stored in the database 112. Each list in the map may be a scenario including a set of analytical/smart factors. Further, in real-time when the user scenario including the set of analytical factors matching any list in the database occurs, the scenario is considered as natural or else considered as unnatural. In the unnatural scenarios case, the additional factors which are making scenario as unnatural/fail are captured. These additional factors are suggested to user for handling the situations next time. For example, when the system identifies the unnatural scenario (or sequence of list not available in the list of maps in database), the system provides option for user to associate the analytical factors and prepare a scenario with required device actions to be taken. As a result, the unnatural scenario becomes a successful/natural scenario. Also, the system automatically identifies such scenarios and creates an automated device action jobs in the system to handle unnatural scenarios. As a result, when such scenarios occur next time, system may execute the automated jobs to handle. Furthermore, updating the database with new scenarios may be a continuous process whenever unnatural scenarios/failures occurs to make them a successful scenario with necessary automated actions. Further, at step 312, the system 100 performs data pre-processing and preparation operations. At step 312, the training data collected at step 302 is analyzed by the system 100. Further, the system 100 determines the user activity pattern with respect to the operating state pattern. For example, the user activity pattern and the operating state pattern include type of the one or more IoT devices 308 associated with the user 306, capabilities of the one or more IoT devices 308, regular activities of the one or more IoT devices 308, durations, operations, conditions, and outputs of the one or more IoT devices 308, user regular behaviour and interactions with the one or more IoT devices 308, pet's regular dependencies with the one or more IoT devices 308, and the like. Further, the user activity pattern and the operating state pattern also include unusual activities of the user during an unusual status/operations (the at least one unusual event) of the one or more IoT devices 308, IoT devices related and engaged with the pets 310, missed tasks related to pets 310 by observing the unusual status/operations of the one or more IoT devices 308, failures of the one or more IoT devices by observing the unusual status/operations of the one or more IoT devices 308, user behaviours during the unusual status/operations of the IoT devices, pet's behaviours during the unusual status/operations of the one or more IoT devices 308, and the like. Furthermore, the user activity pattern and the operating state pattern also include user activities during the unnatural status/operations of the one or more IoT devices 308, user's behaviours during missed IT device tasks, the pet's behaviours during missed IoT device tasks, any IoT device inputs/status changed by user 306 is unnatural, and the like. In an example embodiment of the present disclosure, the pet's behaviour may include movements, voice intensity, actions, activities, postures, emotions of the pets 310, and the like derived from the artificial intelligence analytics.

In an embodiment of the present disclosure, the data analysis and preparation at step 312 may be performed by technologies and/or systems such as, but not limited to, a computer vision technology, context-aware systems, reasoning systems, self-aware systems, video analytics, natural language processing-user voice analysis, situation awareness, big data analytics of user information, posture detections of the user, interactive systems, machine learning, activities detection through data analytics of user systems calendar, tasks, fitness activities, and the like. In an embodiment of the present disclosure, user unnatural behaviour (e.g., the at least one unusual event) may include different interactions and inputs/controls to the one or more IoT devices 308 as compared to regular/daily activity of the user 306, different emotions of the user as compared to regular emotions of the user 306 while engaging with the one or more IoT devices 308, different dialogues of the user 306 as compared to regular dialogues of the user while engaging with the one or more IoT devices 308, different voice intensity of the user as compared to regular voice intensity of the user 306 while engaging with the one or more IoT devices 308, and the like. Further, the user unnatural behaviour (e.g., the at least one unusual event) may also include different actions of the user 306 as compared to regular actions of the user while engaging with the one or more IoT devices, different activities of the user 306 as compared to regular activities of the user 306 while engaging with the one or more IoT devices 308, different postures of the user 306 as compared to regular postures of the user 306 while engaging with the one or more IoT devices 308, and the like. In an embodiment of the present disclosure, the user 306 engages with the one or more IoT devices 308 due to one or more reasons, such as operating/controlling the one or more IoT devices 308, waiting on status of the one or more IoT devices 308, waiting for the notification from the one or more IoT devices 308, observing operations of the one or more IoT devices 308, and the like. Further, unnatural status/operations (e.g., the at least one unusual event) associated with the one or more IoT devices 308, such as different notifications as compared to regular notifications generated via the one or more IoT devices 308, job duration of each of the one or more IoT devices 308 as compared to regular job duration performed by the one or more IoT devices 308, controls/inputs received from the user 306 which is different from regular controls/inputs, output status of the one or more IoT devices 308 different from a regular output status, and the like.

Further, at step 314, the system 100 prepares the database 316 based on the result of step 312. The database 316 includes the one or more association rules. Furthermore, at step 318, the set of analytical factors 320 is prepared. In an embodiment of the present disclosure, the system 100 extracts the set of analytical factors 320 as smart factors from the data obtained after step 312. The set of analytical factors 320 is stored in the database 316. For example, a corresponding analytical factor may include, but not limited to, "user emotion: smile", "IoT device status: turned on", "pet barking", "any kind of user activity", "any kind of pets activity", "interactions of device with user" etc. In an embodiment of the present disclosure, the combination of analytical factors that are part of regular activities, jobs, tasks, operations, and the like may be referred to, for example, as a sequence or a scenario. For example, the sequence or the scenario may be "user opened a door while talking on the phone with a smile and instantaneously room lights are turned automatically on, and the window shades are opened".

Here the analytical parts of this scenario are: "door opened", "user walking", "user talking on phone", "user smile", "lights turned on" and "window shade turned on". In an embodiment of the present disclosure, the extracted analytical factors relationship, dependency, and engagement are analyzed, and a list of scenarios is prepared. Since each scenario is a list of analytical factors, all the scenarios are created as the one or more predefined association rules, as shown in FIG. 3B.

As shown in FIG. 3B, each of the one or more predefined association rules 322 may include one key analytical factor and a set of other analytical factors for creating the scenario. The key analytical factor is an analytical factor without which the scenario may become unnatural. Also, the key analytical factor is a dependency or a trigger point required for the successful completion of a scenario or sequence, which avoids the unnatural sequence or scenario. For example, the "activity" may be the key smart factor, and 'key', 'cooktop', 'door camera', and 'light' are other analytical factors. Similarly, "emotions" may be the key smart factor, and 'smart door', 'smart window', 'pet feeder', and 'floor AC' are other analytical factors. In another example, "voice" may be the key smart factor, and 'garage', 'AI speaker', 'smart speaker', and 'smart TV' are other analytical factors.

In an embodiment of the present disclosure, the one or more predefined association rules 322 are created for the set of analytical factors 320. The one or more predefined association rules 322 are used for training the one or more AI-based models using a supervised machine learning model 324. The supervised machine learning model 324 may understand the one or more predefined association rules 322 or sequence as the expected correct sequence to control the operating state of the one or more IoT devices 308.

Figure 4:
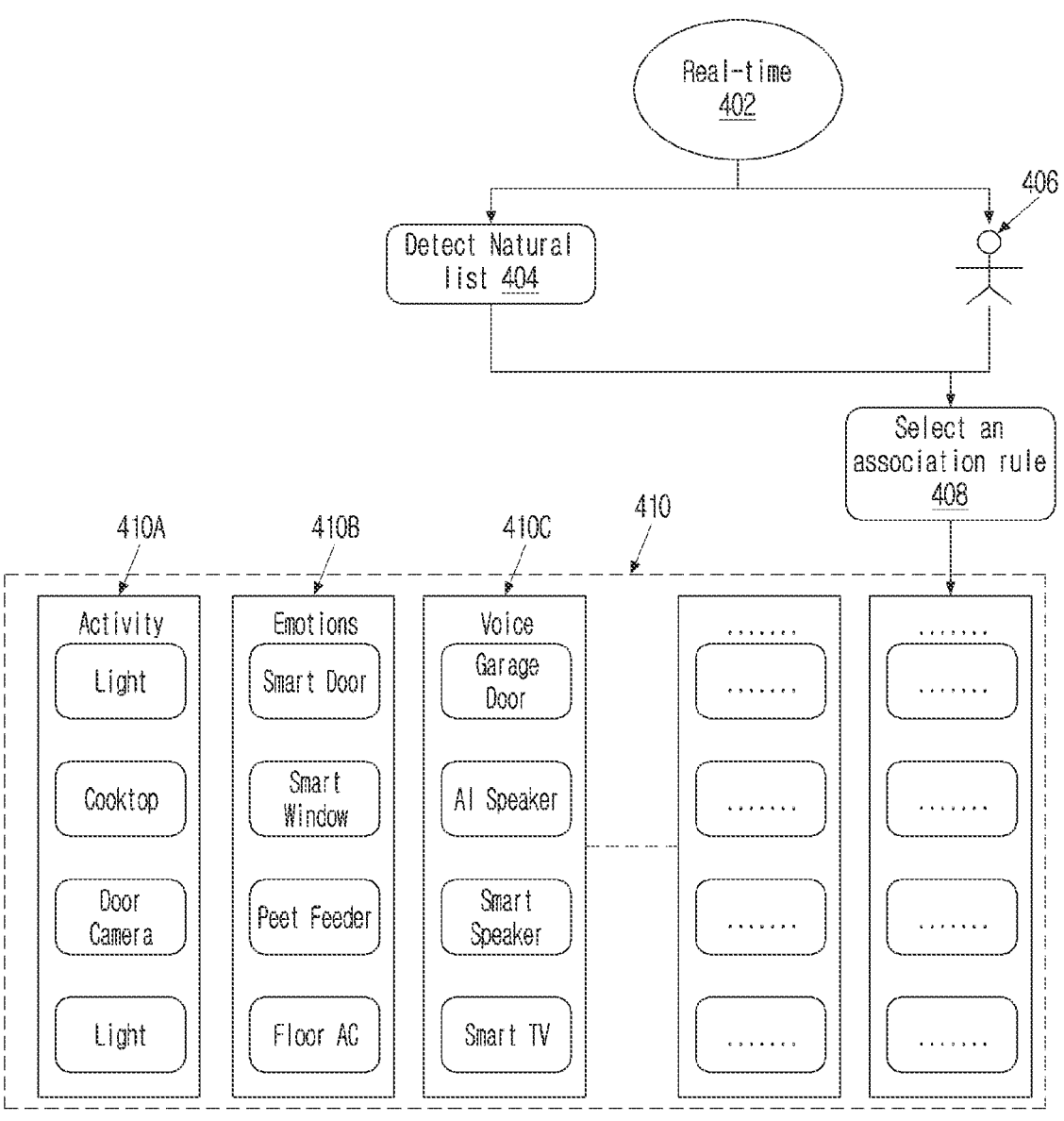
FIG. 4 is a block diagram illustrating an example operation of the system for the user assisted event-context management in the IoT environment, according to various embodiments.

FIG. 4 is a block diagram illustrating an example operation of the system 100 for the user assisted event-context management in the IoT environment, according to various embodiments.

As explained with reference to FIG. 2, the system 100 performs the user assisted event-context management in the IoT environment.

At step 402, in real-time processing, the system 100 detects an unnatural user scenario e.g., a combination of one or more device operations and the analytical factors. In an embodiment of the present disclosure, the unnatural scenario corresponds to an unusual way of one or more device operations, an unusual user emotion, an unusual activity, unusual behavior, or the like.

At step 404, the system 100 may detect the set of analytical factors and the one or more device operations which can make this user scenario unusual. In an embodiment, the system 100 may include or exclude the analytical factors from the set of analytical factors which can make the scenario natural and present to user at step 406. The user can then provide inputs to enable the system 100 to associate the analytical factors with the remaining factors for creating an IoT routine, scene, or automation. This association may be referred to, for example, as a smart association of analytical factors. The scene/routine/automation may correspond to different ways of controlling and customizing various IoT devices. For this scenario, when the user associates the analytical factors in routine, scene, or automation, this makes the sequence natural next time. Further, the smart association of analytical factors may facilitate automated coordination between humans, devices, pets, ambiance, nature, and the like. Also, when the user tries to create a routine, scene, or automation, the system 100 may present a list of analytical factors to the user for the unnatural sequence or scenarios observed. Further, the system 100 informs the user to associate the list of analytical factors to address those problems next time automatically with the routine, scene, or automation.

Further, at step 408, the system 100 automatically attempts to select a predefined association rule for the detected unnatural user scenario for controlling the operating state of the one or more IoT devices. Further, the selected predefined association rule is added to the one or more predefined association rules 410. In an embodiment of the present disclosure, the one or more predefined association rules are a first association rule 410A, a second association rule 410B, and a third association rule 410C. For example, if a predefined association rule is not found for a user scenario, then this user scenario is considered as unnatural scenario. Any user scenario not having the predefined association rule mapped in the database is considered as an unnatural scenario. For the unnatural scenario, an option to create a new predefined association rule is provided to the user or the new predefined association rule is automatically created. Next time onwards, the same user scenario may be natural, since the mapped association rule is already created and available in the database.

For example, the scenario may be the user talking on the phone with frustration and walking out of the kitchen. The smart factors may be the user talking on the phone, frustration, and walking out of the kitchen. The system 100 processes the scenario with trained lists of the analytical factors. Further, the system 100 identifies the "frustration" as an unnatural analytical factor. The system 100 predicts the analytical factors that can make the above scenario natural. For example, the predicted analytical factors may be "pause cooking device" and "turn off lights".

Figure 5:
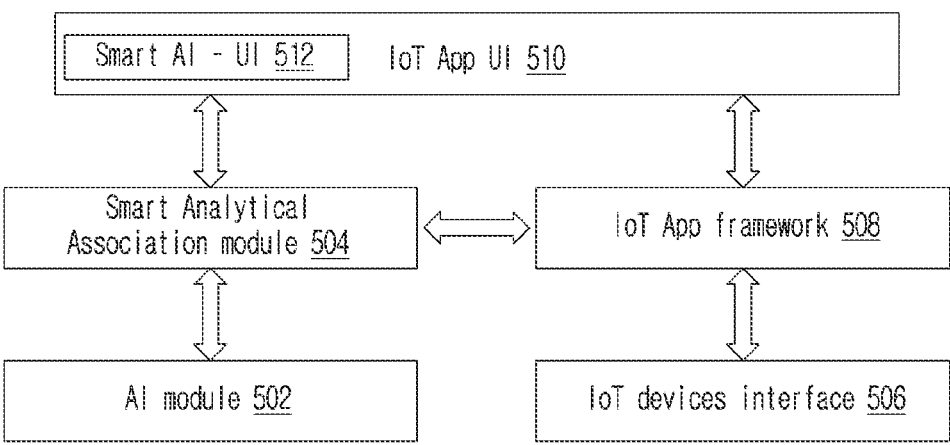
FIG. 5 is a block diagram illustrating an example configuration of the system, according to various embodiments.

FIG. 5 is a block diagram illustrating an example architecture of the system 100, according to various embodiments.

As depicted, the AI module 502 or the generating module 208 generates the set of analytical parameters, such as, but not limited to, user activities, user emotions, user dialogue, user speech, user dialogue, pet movements, pet sounds, object movements, and the like. Further, the smart analytical association module 504 or the generating module 208 allows the user to associate the set of analytical factors derived from the AI module 502. Further, a User Interface (UI) module displays the set of analytical factors to the user in a listed format. The user provides inputs to the system for selecting and associating any of the set of analytical factors to form a smart association of analytical factors. An IoT device interface 506 corresponds to the way in which the user interacts with and controls the one or more IoT devices. Further, an IoT application framework 508 is a structured set of tools, libraries, protocols, and best practices that simplifies the development of IoT applications and solutions. Furthermore, an IoT application UI 510 provide an option for the user to create a rule, device event, or time-based automation for the one or more IoT devices. In an embodiment of the present disclosure, a smart AI-UI 512 provides an option for the user to link the set of analytical factors with IoT device automation.

Figure 6A:
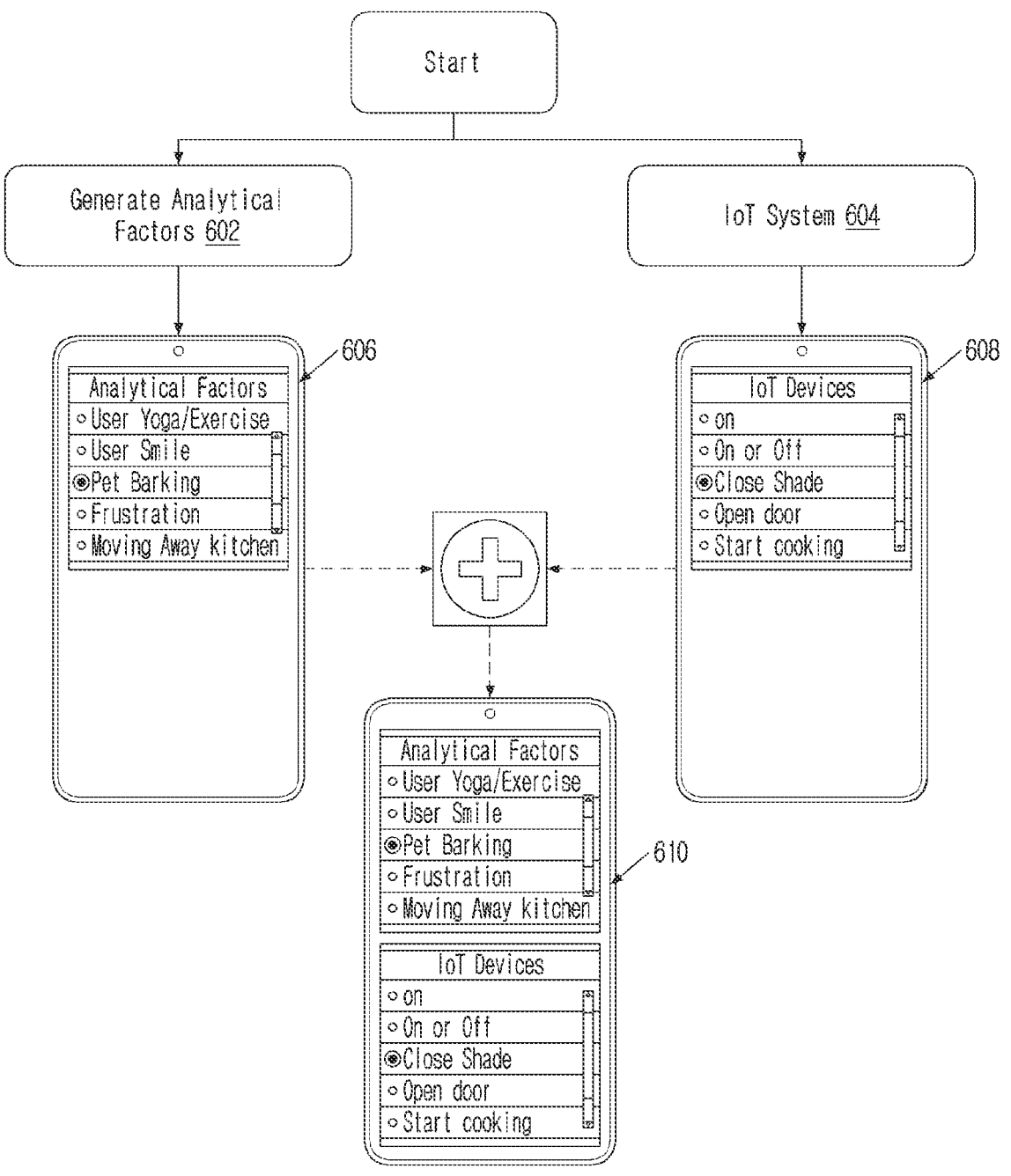
Figure 6B:
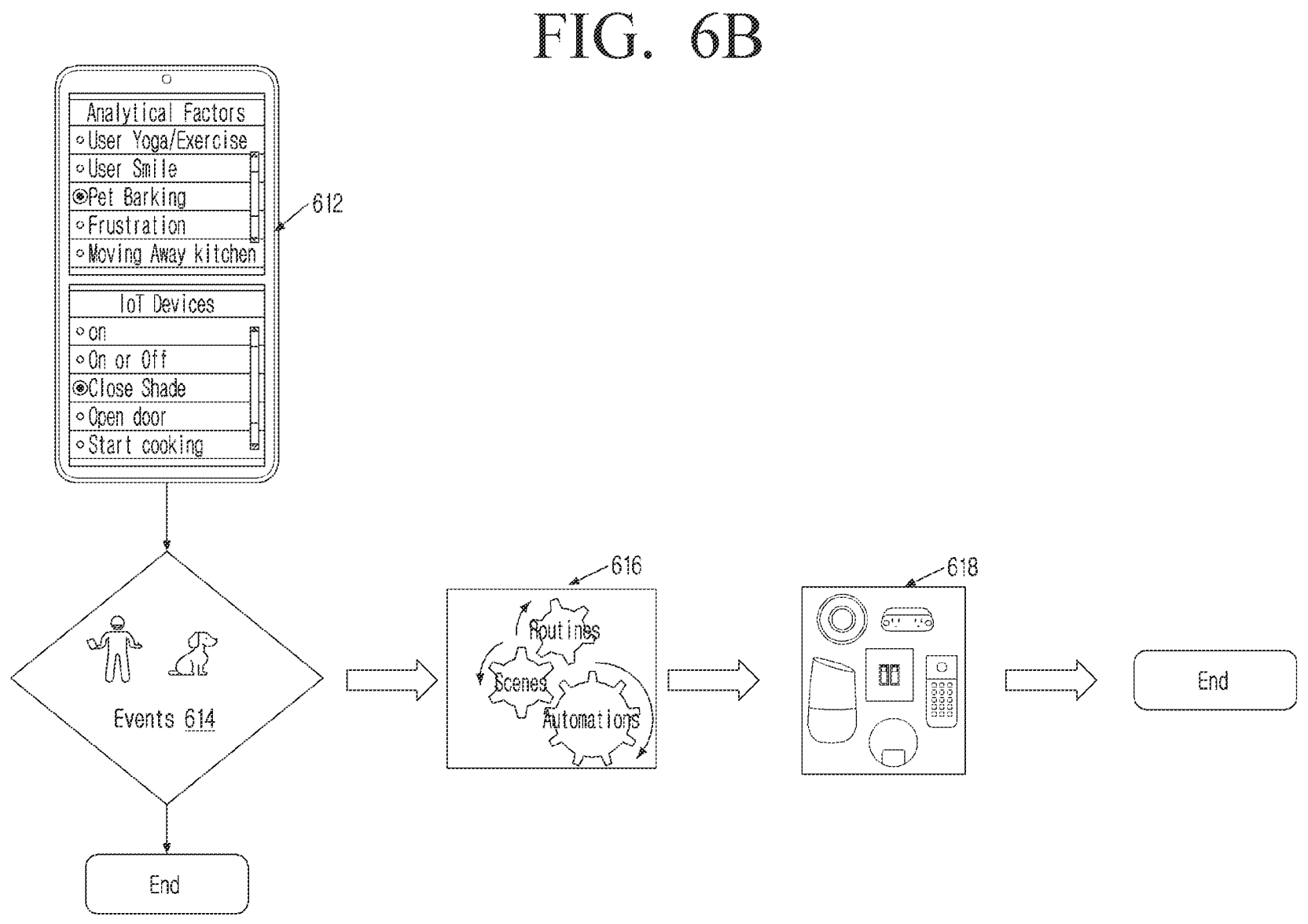
Figure 6C:
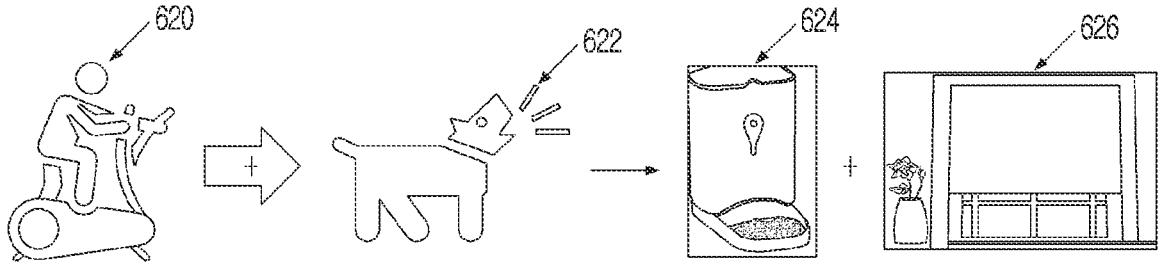

FIGS. 6A, 6B and 6C are diagrams illustrating an example use-case scenario for the user assisted event-context management in the IoT environment, according to various embodiments. For the sake of brevity, FIGS. 6A, 6B and 6C are explained together.

As illustrated in FIG. 6A, the one or more AI models are used to generate the set of analytical factors 602, such as human emotions, activities, pet sounds, pet movements, pet emotions, and the like. Further, the IoT system 604 generates multiple parameters, such as devices, automations, routines, scenes, and the like. As shown at 606, the set of analytical factors associated with the present use-case scenario are user yoga/exercise, user smile, pet barking, frustration, moving away from the kitchen, and the like. Further, as shown at 608, the multiple parameters associated with the present use-case scenario may be ON, or OFF, close shade, open door, start cooking, and the like. At step 610, the user associates the set of analytical factors with multiple factors to create a scenario or sequence. For example, the user associates "pet barking" with "close shade".

In real-time, when the sequence of data points occurs which involves the association of the set of analytical factors with the multiple factors selected by the user, the linked analytical factors (actions) of the IoT devices may be executed to produce the outputs. As illustrated in FIG. 6B, 612 represents the AI events configured with IoT devices. At step 614, the one or more current actions of the user, the one or more events in the IoT environment, or a combination thereof are detected in real time (such as the user doing exercise and the pet starting barking). Further, at step 616, the one or more predefined association rules are obtained from the database based on the detected one or more current actions of the user, the detected one or more events in the IoT environment, or a combination thereof. At step 618, the current operating state of the one or more devices is controlled based on the obtained one or more predefined association rules. For example, in the current scenario, when the pet starts barking, the shade is automatically closed.

In another use case scenario, the user associates the analytical factors "user yoga/exercise" 620 and "pet barking" 622 with IoT device actions "start pet feeder" 624 and "close window blinds" 626. Further, when the events (such as the user doing exercise and the pet barking) are detected in real-time, the system 100 closes the shade device and starts a pet feeder.

In another use case scenario, the user associates the analytical factors "on phone, user using phone, attending call or deeply indulged in phone usage", "user moving away from kitchen", and "user in frustration" with IoT device actions "stop cooking" and "turn off lights". Further, when the events (such as user attending a frustrated phone call and coming out from the kitchen with deeply involved in the call) are detected in real-time, the system 100 stops cooking and turns off lights.

In yet another use case scenario, the user associates the analytical factor "sequence guests" with IT device actions "start cooking" and "play music". Further, when the events (such as family members arrived in same sequence or guests arrived in the same sequence) are detected in real-time, the system 100 starts cooking device and plays music.

In another use case scenario, the user associates the analytical factor "trendy weather" with IoT device actions "close garage door" and "set AC". Further, when the events (such as trending weather) are detected in the real-time, the system 100 closes the garage door and sets the AC device.

In another use case scenario, the user associates the analytical factor "moving object" with IoT device actions "close door". Further, when the events (such as an object moving repeatedly towards the window) are detected in the real-time, the system 100 closes the door.

FIG. 7 is a flowchart illustrating an example method 700 for user assisted event-context management in an IoT environment, according to various embodiments. The method 700 may be performed by a system 100 implemented in an electronic device 102, as shown in FIGS. 1 and 2.

At step 702, the method 700 includes detecting, via one or more IoT devices and the one or more smart devices, at least one of one or more current actions of a user or one or more events in the IoT environment using a data analytics-based Artificial Intelligence (AI) model. Further, at step 704, the method 700 includes detecting, via the one or more IoT devices, a current operating state of each of one or more devices within the IoT environment.

At step 706, the method 700 includes obtaining, from a database in response to the detection of the at least one of one or more current actions of the user, the one or more events in the IoT environment or the current operating state of the one or more devices, one or more predefined association rules indicating a relationship between each of a plurality of predefined user actions, a plurality of predefined events, and pre-configured operating states of the one or more devices. In an example embodiment of the present disclosure, the plurality of predefined user actions includes user emotions, user activities, user speech, user dialogue, user gestures, user behaviour, and user interactions with at least one of the one or more devices, a pet, one or more family members, guests, or any combination thereof. In an example embodiment of the present disclosure, the plurality of predefined events includes a movement of one or more objects within the IoT environment, weather conditions, interactions of a pet with the user, or one of activities, emotions, behaviour associated with the pet, or any combination thereof.

Furthermore, at step 708, the method 700 includes controlling the current operating state of the one or more devices based on the obtained one or more predefined association rules. In controlling the current operating state of the one or more devices, the method 700 includes determining one or more device actions to be performed by the one or more devices based on the obtained one or more predefined association rules. Further, the method 700 includes controlling one or more operating modes of the one or more devices based on the determined one or more device actions.

Further, the method 700 includes monitoring, using the one or more IoT devices within the IoT environment, the plurality of user actions and a plurality of events over a period of time. The method 700 includes determining, using one or more Artificial Intelligence (AI)-based models, a user activity pattern with respect to an operating state pattern of the one or more devices based on a result of the monitoring of the plurality of user actions and the plurality of predefined events over a period of time. Furthermore, the method 700 includes generating, using the one or more AI-based models, a set of analytical factors based on the determined user activity pattern. In an embodiment of the present disclosure, the set of analytical factors correspond to the plurality of predefined user actions, the plurality of predefined events, or a combination thereof.

Furthermore, the method 700 includes selecting at least one analytical factor from the set of analytical factors based on a reception of at least one user input. The method 700 includes mapping the at least one selected analytical factor with one or more operating modes of the one or more devices. Further, the method 700 includes generating the one or more predefined association rules based on the mapping. In an embodiment of the present disclosure, each of one or more predefined association rules corresponds to a regular user-scenario for controlling the one or more operating modes of the one or more devices.

Further, the method 700 includes detecting, using the one or more IoT devices, at least one unusual event within the IoT environment that is un-defined in the one or more predefined association rules. In an embodiment of the present disclosure, the at least one unusual event corresponds to an event that indicates an unusual condition within the IoT environment or an event indicating unusual pattern associated with use of the one or more devices in the IoT environment. Further, the method 700 includes determining, using information included in the database, a corresponding predefined association rule associated with the detected least one unusual event. The method 700 includes generating, using one or more AI-based models, one or more additional analytical factors based on the determined corresponding predefined association rule. Furthermore, the method 700 includes controlling the current operating state of the one or more devices based on the generated one or more additional analytical factors and predefined operation information.

Further, the method 700 includes displaying the generated one or more additional analytical factors on a display screen of a user device associated with the user. The method 700 includes mapping the generated one or more additional analytical factors with one or more operating modes of the one or more devices based on a reception of at least one user input on the displayed one or more additional analytical factors. Furthermore, the method 700 includes generating the one or more predefined association rules based on the mapping. The method 700 includes controlling the current operating state of the one or more devices based on the generated one or more predefined association rules.

While the above steps shown in FIG. 7 are described in a particular sequence, the steps may occur in variations to the sequence in accordance with various embodiments of the present disclosure. Further, the details related to various steps of FIG. 7, which are already covered in the description related to FIGS. 1-6 may not be repeated here for the sake of brevity.

FIG. 8 is a flowchart illustrating an example method 800 for the user assisted event-context management in an IoT environment, according to various embodiments. The method 800 may be performed by a system 100 implemented in the electronic device 102, as shown in FIGS. 1 and 2.

At step 802, the method 800 includes detecting, via a first IoT device and the one or more smart devices, a user event using a data analytics-based Artificial Intelligence (AI) model. In an embodiment of the present disclosure, the user event includes one or more current actions of a user, user activity, user emotions, a physical activity of a pet, emotion of the pet, behaviour of the user, and one or more events in the IoT environment.

At step 804, the method 800 includes obtaining, from a database in response to the detection of the user event, one or more predefined association rules. In an embodiment of the present disclosure, the one or more predefined association rules indicate a relationship between each of a plurality of predefined user actions, a plurality of predefined events, and pre-configured operating states of one or more devices. Further, the plurality of predefined user actions includes the user emotions, user activities, user speech, user dialogue, user gestures, user behaviour, and user interactions with at least one of the one or more devices, a pet, one or more family members, guests, or any combination thereof. In an embodiment of the present disclosure, the plurality of predefined events includes movement of one or more objects within the IoT environment, weather conditions, interactions of a pet with the user, or one of activities, emotions, behaviour associated with the pet, or a combination thereof.

At step 806, the method 800 includes applying, in response to the detection of the user event, the one or more predefined association rules to alter the current operating state of one or more devices within the IoT environment, as a response to the detected user event.

While the above steps shown in FIG. 8 are described in a particular sequence, the steps may occur in variations to the sequence in accordance with various embodiments of the present disclosure. Further, the details related to various steps of FIG. 8, which are already covered in the description related to FIGS. 1-7 may not be repeated here for the sake of brevity.

The present disclosure provides for various technical advancements based on the key features discussed above. The present disclosure creates a smart association of the set of analytical factors and configures the set of analytical factors with the one or more IoT devices for addressing the human and device coordination problems in real-time. The present disclosure presents the set of analytical factors to the user in a listed format and allows the user to select one or more analytical factors from the set of analytical factors to create a smart association of analytical factors. Further, the user is allowed to configure the formed "smart association of analytical factors" with any of the electronic devices or a combination of electronic devices. Further, in real time whenever the associated analytical factors occur, the configured electronic devices automatically start doing the preconfigured set of jobs. The present disclosure can be used in all the systems using artificial intelligence. Further, the present disclosure brings new platforms, use cases, and products by providing an opportunity to combine user real-time activities, emotions, or living conditions with connected electronic devices. Thus, human natural living is integrated with electronic devices to address real-time coordination problems of humans, pets, and electronic devices.

The plurality of modules 108 may be implemented by any suitable hardware and/or set of instructions. Further, the sequential flow illustrated in FIG. 2 is an example and the disclosure may include the addition/omission of steps as per the requirement. In various embodiments, the one or more operations performed by the plurality of modules 108 may be performed by the processor/controller based on the requirement.

While specific language has been used to describe the present subject matter, any limitations arising on account thereto, are not intended. As would be apparent to a person in the art, various working modifications may be made to the method in order to implement the disclosed concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method for event-context management in an Internet of Things (IoT) environment, the method comprising:
   detecting, via at least one of one or more smart devices and one or more IoT devices, at least one of one or more current actions of a user or one or more events in the IoT environment using a data analytics-based Artificial Intelligence (AI) model;
   detecting, via the one or more IoT devices, a current operating state of each of one or more devices within the IoT environment;
   obtaining, from a database in response to the detection of the at least one of one or more current actions of the user, the one or more events in the IoT environment or the current operating state of the one or more devices, one or more specified association rules indicating a relationship between each of a plurality of specified user actions, a plurality of specified events, and pre-configured operating states of the one or more devices; and
   controlling the current operating state of the one or more devices based on the obtained one or more specified association rules.

2. The method as claimed in claim 1, wherein the plurality of specified user actions includes at least one of user emotions, user activities, user speech, user dialogue, user gestures, user behavior, and user interactions with at least one of the one or more devices, a pet, one or more family members, or guests.

3. The method as claimed in claim 1, wherein the plurality of specified events includes at least a movement of one or more objects within the IoT environment, weather conditions, interactions of a pet with the user, or one of activities, emotions, or behavior associated with the pet.

4. The method as claimed in claim 1, further comprising:
   monitoring, using the one or more IoT devices within the IoT environment, the plurality of user actions and a plurality of events over a period of time;
   determining, using one or more Artificial Intelligence (AI)-based models, a user activity pattern with respect to an operating state pattern of the one or more devices based on a result of the monitoring of the plurality of user actions and the plurality of specified events over a period of time; and
   generating, using the one or more AI-based models, a set of analytical factors based on the determined user activity pattern, wherein the set of analytical factors corresponds to at least one of the plurality of specified user actions and the plurality of specified events.

5. The method as claimed in claim 4, further comprising:
   selecting at least one analytical factor from the set of analytical factors based on a reception of at least one input;
   mapping the at least one selected analytical factor with one or more operating modes of the one or more devices; and
   generating the one or more specified association rules based on the mapping, wherein each of one or more specified association rules correspond to a regular user scenario for controlling the one or more operating modes of the one or more devices.

6. The method as claimed in claim 1, wherein controlling the current operating state of the one or more devices comprises:
   determining one or more device actions to be performed by the one or more devices based on the obtained one or more specified association rules; and
   controlling one or more operating modes of the one or more devices based on the determined one or more device actions.

7. The method as claimed in claim 1, further comprising:
   detecting, using the one more IoT devices and the one or more smart devices, at least one unusual event within the IoT environment undefined in the one or more specified association rules using the data analytics-based AI model, wherein the at least one unusual event corresponds to one of an event that indicates an unusual condition within the IoT environment or an event indicating unusual pattern associated with the use of the one or more devices in the IoT environment;
   determining, using information included in the database, a corresponding specified association rule associated with the detected least one unusual event;
   generating, using one or more AI-based models, one or more additional analytical factors based on the determined corresponding specified association rule; and
   controlling the current operating state of the one or more devices based on the generated one or more additional analytical factors and specified operation information.

8. The method as claimed in claim 7, further comprising:
   displaying the generated one or more additional analytical factors on a display screen of a user device associated with the user;
   mapping the generated one or more additional analytical factors with one or more operating modes of the one or more devices based on a reception of at least one input on the displayed one or more additional analytical factors;
   generating the one or more specified association rules based on the mapping; and controlling the current operating state of the one or more devices based on the generated one or more specified association rules.

9. A method for user assisted event-context management in an Internet of Things (IoT) environment, the method comprising:

detecting, via a first IoT device and one or more smart devices, a user event using a data analytics-based Artificial Intelligence (AI) model, wherein the user event comprises one or more current actions of a user, user emotions, a physical activity of a pet, and one or more events in the IoT environment;

obtaining, from a database in response to the detection of the user event, one or more specified association rules; and applying, in response to the detection of the user event, the one or more specified association rules to alter a current operating state of one or more devices within the IoT environment, as a response to the detected user event.

10. The method as claimed in claim 9, wherein the one or more specified association rules indicate a relationship between each of a plurality of specified user actions, a plurality of specified events, and pre-configured operating states of one or more devices.

11. The method as claimed in claim 10, wherein the plurality of specified user actions includes at least the user emotions, user activities, user speech, user dialogue, user gestures, user behavior, and user interactions with at least one of the one or more devices, a pet, one or more family members, or guests.

12. The method as claimed in claim 10, wherein the plurality of specified events includes at least a movement of one or more objects within the IoT environment, weather conditions, interactions of a pet with the user, or one of activities, emotions, or behavior associated with the pet.

13. A system for event-context management in an Internet of Things (IoT) environment, the system comprising:

a memory; and at least one processor, comprising processing circuitry, communicably coupled to the memory, at least one processor, individually and/or collectively configured to:

detect, via one or more IoT devices and one or more smart devices, at least one of one or more current actions of a user or one or more events in the IoT environment using a data analytics-based Artificial Intelligence (AI) model;

detect, via the one or more IoT devices, a current operating state of each of one or more devices within the IoT environment;

obtain, from a database in response to the detection of the at least one of one or more current actions of the user, the one or more events in the IoT environment or the current operating state of the one or more devices, one or more specified association rules indicating a relationship between each of a plurality of specified user actions, a plurality of specified events, and pre-configured operating states of the one or more devices; and control the current operating state of the one or more devices based on the obtained one or more specified association rules.

14. The system as claimed in claim 13, wherein the plurality of specified user actions includes at least one of user emotions, user activities, user speech, user dialogue, user gestures, user behavior, and user interactions with at least one of the one or more devices, a pet, one or more family members, or guests.

15. The system as claimed in claim 13, wherein the plurality of specified events includes at least a movement of one or more objects within the IoT environment, weather conditions, interactions of a pet with the user, or one of activities, emotions, or behavior associated with the pet.

16. The system as claimed in claim 13, wherein at least one processor, individually and/or collectively, is configured to:

monitor, using the one or more IoT devices within the IoT environment, the plurality of user actions and a plurality of events over a period of time;

determine, using one or more Artificial Intelligence (AI)-based models, a user activity pattern with respect to an operating state pattern of the one or more devices based on a result of the monitoring of the plurality of user actions and the plurality of specified events over a period of time; and generate, using the one or more AI-based models, a set of analytical factors based on the determined user activity pattern, wherein the set of analytical factors correspond to at least one of the plurality of specified user actions and the plurality of specified events.

17. The system as claimed in claim 16, wherein at least one processor, individually and/or collectively, is configured to:

select at least one analytical factor from the set of analytical factors based on a reception of at least one input;

map the at least one selected analytical factor with one or more operating modes of the one or more devices; and generate the one or more specified association rules based on the mapping, wherein each of one or more specified association rules correspond to a regular user-scenario for controlling the one or more operating modes of the one or more devices.

18. The system as claimed in claim 13, wherein, in controlling the current operating state of the one or more devices, at least one processor, individually and/or collectively, is configured to:

determine one or more device actions to be performed by the one or more devices based on the obtained one or more specified association rules; and control one or more operating modes of the one or more devices based on the determined one or more device actions.

19. The system as claimed in claim 13, wherein at least one processor, individually and/or collectively, is configured to:

detect, using the one more IoT devices and the one or more smart devices, at least one unusual event within the IoT environment not defined in the one or more specified association rules using the data analytics-based AI model, wherein the at least one unusual event corresponds to one of an event that indicates an unusual condition within the IoT environment or an event indicating unusual pattern associated with use of the one or more devices in the IoT environment;

determine, using information included in the database, a corresponding specified association rule associated with the detected least one unusual event;

generate, using one or more AI-based models, one or more additional analytical factors based on the determined corresponding specified association rule; and control the current operating state of the one or more
devices based on the generated one or more additional
analytical factors and specified operation information.

20. The system as claimed in claim 19, wherein at least
one processor, individually and/or collectively, is configured
to:

display the generated one or more additional analytical
factors on a display screen of a user device associated
with the user;

map the generated one or more additional analytical
factors with one or more operating modes of the one or
more devices based on a reception of at least one input
on the displayed one or more additional analytical
factors;

generate the one or more specified association rules based
on the mapping; and control the current operating state of the one or more
devices based on the generated one or more specified
association rules.

* * * * *